United States Patent [19]

Olsson et al.

[11] Patent Number: 5,105,772
[45] Date of Patent: Apr. 21, 1992

[54] METHOD FOR IMPROVING COMBUSTION IN COMBUSTION ENGINES

[76] Inventors: John Olsson, Alfiskevägen 8B, S-433 41 Partille; Bertil Olsson, Krondammsvägen 41, S-433 43 Partille; Gunnar Olsson, Fangdammsvägen 16, S-433 31 Partille; Arne Lindstrom, Raggesas 9792, S-422 90 Kungälv, all of Sweden

[21] Appl. No.: 548,956
[22] PCT Filed: Jan. 27, 1989
[86] PCT No.: PCT/SE89/00022
§ 371 Date: Sep. 27, 1990
§ 102(e) Date: Sep. 27, 1990
[87] PCT Pub. No.: WO89/07196
PCT Pub. Date: Aug. 10, 1989

[30] Foreign Application Priority Data

Jan. 29, 1988 [SE] Sweden ............................ 8800291

[51] Int. Cl.[5] .................................. F02B 75/12
[52] U.S. Cl. ........................... 123/1 A; 44/300
[58] Field of Search ........................ 123/1 A; 44/300

[56] References Cited

U.S. PATENT DOCUMENTS

| 4,182,278 | 1/1980 | Coakwell | 123/1 A |
| 4,359,969 | 11/1982 | Mellovist et al. | 123/1 A |
| 4,398,505 | 8/1983 | Cahill | 123/1 A |
| 4,406,254 | 9/1983 | Harris et al. | 123/1 A |

Primary Examiner—E. Rollins Cross
Attorney, Agent, or Firm—Harrison & Egbert

[57] ABSTRACT

Method to improve the combustion in a combustion engine for reducing the content of harmful components of the exhausts, whereby a liquid composition including a peroxide or a peroxo compound is supplied to the combustion chamber. The liquid composition is injected in such a way that a portion of the liquid composition passes through the outlet valve (17), when the engine goes from exhaust to intake stroke, thus causing an improved afterburning in both exhaust pipe (16) and possible catalytic equipment.

8 Claims, 1 Drawing Sheet

METHOD FOR IMPROVING COMBUSTION IN COMBUSTION ENGINES

This invention refers to a method for improving the combustion in combustion engines, and reducing the amounts of harmful components in the exhausts, whereby a liquid composition including a peroxide or peroxo compound is supplied to the combustion chamber.

BACKGROUND OF THE INVENTION

The increased number of cars, especially in urban areas are causing an increase of exhausts, with health and environmental problems connected thereto. The harmful components causing the major problems are mainly carbon oxide, hydro carbons and nitrogen oxides. The underlaying cause for the unclean exhausts are incomplete combustion. Different techniques are used for reducing the amounts of these components, the most common is the wellknown catalytic technique, which provides a combustion of the exhausts outside the actual combustion process.

Concerning diesel exhaust gases there are a number of problems to solve. One of these is the soot formation, another is the nitrogen oxides formed during the combustion. It is possible to reduce the emissions of carbon oxide and hydro carbons using a catalytic equipment. The complications occuring doing this is, besides oxidizing CO and HC to $CO_2$ and water, that a certain amount of nitrogen is oxidized to nitrogen oxide (NOx). The reason for this is that a diesel engine inevitably is working with a surplus of air. Another problem is that the soot after a certain time hinders the function of the catalyzer. The soot can be reduced by for example partly or completely substituting diesel with ethanol. The problems with the nitrogen oxides however remains.

THE PURPOSE OF THE INVENTION AND ITS MOST IMPORTANT CHARACTERISTICS

The purpose of this invention is to achieve an improved combustion and thereby decrease the emissions of harmful components in the exhausts from combustion engines in such a way that soot and nitrogen oxides are reduced in both engine and catalytic equipment, even if the engine is a diesel engine. This has been achieved by injecting said liquid composition into each cylinder of the engine in such a way that a portion of the liquid composition passes through the outlet valve when the engine shifts from outlet to inlet stroke, thus causing an improved afterburning in both exhaust pipe and possible catalytic equipment.

DESCRIPTION OF THE DRAWINGS

The invention will below be closer described with references to an embodiment shown in the drawings.

DESCRIPTION OF AN EMBODIMENT

Figure 1:
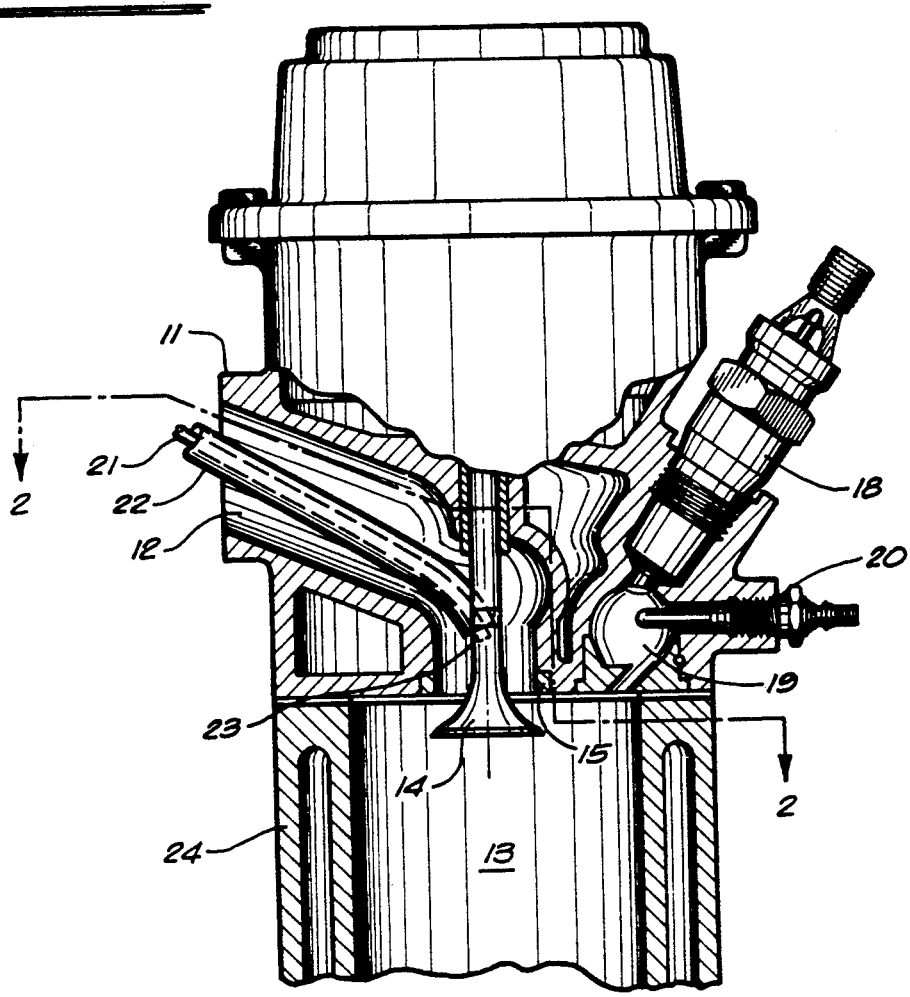
FIG. 1 is a vertical section through a cylinder head of a diesel engine showing the intake valve.
Figure 2:
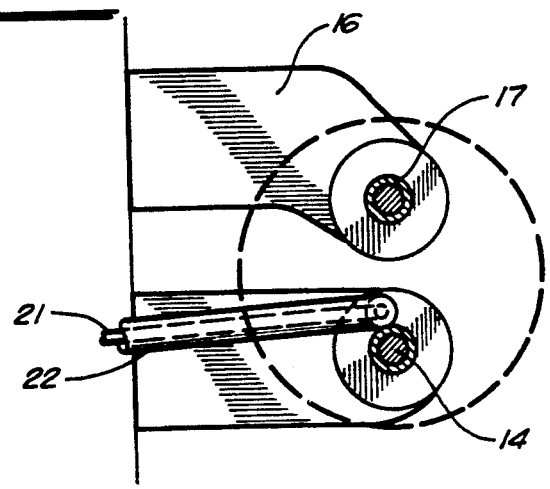
FIG. 2 is a section along the line II—II in FIG. 1

The drawings show a diesel engine with a cylinder head 11, an inlet pipe 12 to the combustion room 13 of the engine and an inlet valve 14 interacting with a valve seat 15. The exhaust pipe is denoted 16 and the exhaust valve is denoted 17. A fuel injector is denoted 18. In this embodiment the fuel is injected into a precombustion chamber 19, which is equipped with a heater plug 20 to faciliate cold starts. An alternative to this is to inject the fuel directly into the combustion room 13.

A feeding line 21 is positioned in the inlet pipe 12, for feeding a liquid composition including a peroxide or peroxo compounds, water and possibly other additives which will be described below. The feeding line 21 is positioned with play inside a second line 22 for a medium having a pressure differing from the pressure at the mouth piece 23 of the feeding line 21. The mouth piece 23 is positioned in close vicinity of the inlet valve. It can also be positioned inside the engine's combustion chamber. The medium may be gaseous, and consist of atmospheric air, in which case the line 22 is arranged to communicate with the atmosphere outside the engine. The medium may also be exhausts from the engine, which under pressure are fed through the line 22. It may also be a pressurized gas for example a small amount of air derived from a turbo charger or from a special airpump.

With such a device an atomiztion of the supplied liquid composition is achieved. The end portions of the lines 21 and 22 can be arranged in different manners as described in the Swedish patent application no. 8604448-4 (corresponds to PCT/SE87/00477). Thus the mouth piece 23 of the feeding line 22 can be axially displaced relative the mouth piece of the line 22, so that the mouth piece 23 is positioned either inside or outside the mouth piece of line 22. The liquid or the drops of the liquid will thus be atomized in the mediaflow from the line (22).

An alternative arrangement is to let the lines 21 and 22 have a common outlet opening with a diameter smaller than the end portion 23 of the feeding line 22. This common outlet may be widened in order to guide the flow after the narrow passage, where an effective mixing of the liquid and the medium has taken place.

If extra fuel is to be added, for example ethanol it can be supplied via a feeding line positioned outside the feeding line 21, but inside the medium line 22. The feeding and regulating of the liquid composition is handled by a feeding device (not shown). As the liquid is fed under almost no pressure, and in some cases in very small quantities, the gas flow is essential for the atomization of the liquid. Naturally more than one feeding line (21) surrounded by a line 22, can be arranged for each cylinder. An alternative is to mix the fuel (for example alcohol) in the supplied liquid composition.

The composition of the liquid can vary, but it shall hold 0.001–80%, preferably 0.1–35%, peroxide or a peroxo compound, preferably hydrogen peroxide. It can also contain up to 5% of an oil, with an anticorrosive additive. The remaining parts consists of water and/or an aliphatic alcohol having one to eight carbon atoms, preferably ethanol. The alcohol is preferably 10–95% of the composition.

Important when arranging a feeding system for peroxides or peroxo compounds is to avoid long transportation distances and common metals. As it is hard to construct a high pressure system without using metals in the feeding system also high pressure should be avoided, as this easily causes disintegration of the unstable compounds.

Another important factor is that the liquid is injected in a steep angle into the combustion room 13, that is as central as possible, in order to avoid contact with the cylinder wall 24. If the liquid comes in contact with the cylinder wall there is a risk for the liquid to loose its properties, and also that it will pierce down into the crankcase oil. It may also wash the cylinder walls clean resulting in increased cylinder wear, and increased oil consumption.

A result of injecting the liquid as described above with continous injection is that a portion of the liquid passes through the overlap out into the exhaust pipe 16. This is an advantage as certain liquids improves the afterburning in the exhaust pipe. If catalytic equipment is present the afterburning in the catalytic equipment is being significantly improved, that is the efficiency of the catalytic equipment has improved. By adjusting the length of the overlap between the inlet and outlet valves 14 and 17 it is possible to increase or decrease the portion of liquid passing out through the overlap. This can be done at new constructions or when replacing the camshaft with a new. This can also be done by changing the distance from the mouth piece 23 to the outlet valve 17. The longer the distance is, the smaller the portion passing out to the exhaust pipe is.

In the introduction we mentioned problems occuring when using catalytic equipment on diesel vehicles. The problems are soot formation and build-up of nitrogen oxides (NOx). These problems can be solved by supplying a peroxide or peroxo compound in the same manner as described above. Tests have been conducted at "Statens teknologiska Institut", STI in Norway, on a diesel engine Volvo Penta MD1. The tests was conducted without catalyzer and liquid (test 1), and with catalyzer in combination with injection of a liquid containing some peroxides (test 2). The composition of the liquid in this test was 10% of a 7% hydrogen peroxide solution and 90% ethanol. The major part of the diesel was in this case substituted with the liquid composition.

Following results was achieved:

|        | CO ppm | $CO_2$ % | HC ppm | NOx ppm | Soot Bosch |
|--------|--------|----------|--------|---------|------------|
| Test 1 | 2600   | 8.5      | 200    | 1400    | 4.2        |
| Test 2 | 15     | 10.4     | 150    | 400     | 0.25       |

It must be noted that the diesel engine works with a big surplus of air and high combustion temperature. In spite of this the NOx emissions have been reduced. The efficiency of the engine is not changed.

The ratio of liquid composition relative the ordinary fuel can range between some tenth of a per cent up to almost 100%. In the latter case the major part would preferably be alcohol, which will be combusted as in an "Otto-engine" without soot formation.

This invention is not limited to diesel engines. It also applies on all types of combustion engines, as for example petrol engines.

We claim:

1. A method for improving the combustion in a combustion engine for the reduction of the content of harmful components in the exhaust, the combustion engine having an exhaust outlet valve, the combustion engine having an exhaust phase and an intake phase, the method comprising the steps of:
   injecting a liquid composition including a peroxide or a peroxo compound to a combustion chamber of said engine; and
   passing a portion of said liquid composition through said exhaust outlet valve as said engine goes from said exhaust phase to said intake phase, said step of passing occurring during said step of injecting.

2. The method of claim 1, further comprising the steps of:
   supplying said liquid composition through a feeding line having a mouthpiece in close proximity to said combustion chamber, said feeding line positioned within a line;
   causing a pressure differential between a medium within said line and said liquid composition of said mouthpiece;
   atomizing said liquid composition at said mouthpiece; and
   directing the atomized liquid composition toward said combustion chamber.

3. The method of claim 2, said step of directing comprising:
   distributing the atomized liquid composition in said combustion chamber and in close proximity to said exhaust outlet valve; and
   opening said exhaust outlet valve during a portion of said step of distributing.

4. The method according to claim 3, said liquid composition includes at least 0.001% peroxide or peroxo compound.

5. The method according to claim 3, said liquid composition including 0.1–35% of peroxide or peroxo compounds.

6. The method according to claim 4, said liquid composition includes up to the 99% of an aliphatic alcohol having 1–8 carbon atoms.

7. The method according to claim 6, said liquid composition including 10–95% of alcohol.

8. The method according to claim 6, said alcohol consists of ethanol.

* * * * *